(12) United States Patent
Marupaduga (10) Patent No.: US 11,991,577 B2
(45) Date of Patent: *May 21, 2024

(54) DYNAMIC ASSIGNMENT OF USERS IN A MULTI-BAND NETWORK BASED ON THE ANTENNA SECTOR POWER RATIO (SPR)

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,640

(22) Filed: Apr. 18, 2023

(65) Prior Publication Data
US 2023/0254744 A1 Aug. 10, 2023

Related U.S. Application Data

(63) Continuation of application No. 17/386,953, filed on Jul. 28, 2021, now Pat. No. 11,716,658, which is a continuation of application No. 16/904,280, filed on Jun. 17, 2020, now Pat. No. 11,129,069.

(51) Int. Cl.
*H04W 36/06* (2009.01)
*H04W 36/20* (2009.01)
*H04W 36/22* (2009.01)
*H04W 36/38* (2009.01)

(52) U.S. Cl.
CPC .......... *H04W 36/06* (2013.01); *H04W 36/20* (2013.01); *H04W 36/22* (2013.01); *H04W 36/38* (2013.01)

(58) Field of Classification Search
CPC ..... H04W 36/06; H04W 36/20; H04W 36/22; H04W 36/38
USPC ...................................................... 455/452.1
See application file for complete search history.

(56) References Cited

U.S. PATENT DOCUMENTS

2005/0179610 A1 8/2005 Le et al.

*Primary Examiner* — Joel Ajayi
(74) *Attorney, Agent, or Firm* — Shook, Hardy & Bacon L.L.P.

(57) ABSTRACT

Methods and systems are provided for delaying a dynamic connection modification of a user device connection. A first frequency band is determined to have a greater sector power ratio (SPR) than a second frequency band. The first frequency band is determined to have a loading factor above a threshold. Based at least in part on the first frequency band having the greater SPR and the first frequency band having the loading factor above the threshold, a connection of the user device to the first frequency band for access for to a wireless communication protocol is delayed.

20 Claims, 5 Drawing Sheets

DYNAMIC ASSIGNMENT OF USERS IN A MULTI-BAND NETWORK BASED ON THE ANTENNA SECTOR POWER RATIO (SPR)

CROSS REFERENCE TO RELATED APPLICATIONS

This application is a continuation of, and claims priority from, U.S. patent application Ser. No. 17/386,953, filed on Jul. 28, 2021, entitled "DYNAMIC ASSIGNMENT OF USERS IN A MULTI-BAND NETWORK BASED ON THE ANTENNA SECTOR POWER RATIO"; which is a continuation of U.S. patent application Ser. No. 16/904,280, filed on Jun. 17, 2020, entitled "DYNAMIC ASSIGNMENT OF USERS IN A MULTI-BAND NETWORK BASED ON THE ANTENNA SECTOR POWER RATIO"; which are each hereby expressly incorporated herein by reference in their entirety.

SUMMARY

The present disclosure is directed, in part, to dynamic assignment of users in a multi-band network based on an antenna sector power ratio (SPR), substantially as shown in and/or described in connection with at least one of the figures, and as set forth more completely in the claims.

In brief and at a high level, this disclosure describes, among other things, methods and systems for delaying a dynamic connection modification of a user device to a first frequency band for access to a first wireless communication protocol. In aspects, the delay is based in part on a determination that the first frequency band has a greater SPR than a second frequency band. The delay is also based on another determination that the first frequency band has a first loading factor above a threshold. As such, a connection of the user device connection to the first frequency band is delayed.

In other aspects, it is determined that the first frequency band does not have the loading factor above the threshold. Based on this determination, the connection of the user device is dynamically changed from the second frequency band to the first frequency band. Further, in other aspects, the user device may have entered within a connection range for both the first frequency band and the second frequency band. Based on a determination that the first frequency band has a higher SPR than the second frequency band, and that the first frequency band has a loading factor higher than the threshold, the user device is connected to the second frequency band.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GSM Global System for Mobile communications
DVD Digital Versatile Discs
EEPROM Electrically Erasable Programmable Read Only Memory
FD-MIMO Full Dimensional Multiple Input Multiple Output
HSDPA High Speed Downlink Packet Access
LTE Long Term Evolution
MIMO Multiple Input Multiple Output
mMIMO Massive Multiple Input Multiple Output
MU-MIMO Multiple User Multiple Input Multiple Output
PC Personal Computer
PDA Personal Digital Assistant
RAM Random Access Memory
RF Radio-Frequency
RLFs Radio Link Failures
ROM Read Only Memory
SHF Super High Frequency SINR Transmission-to-Interference-Plus-Noise Ratio
SMS Short Message Service
SPR Sector Power Ratio
UE User Equipment
UHF Ultra High Frequency
UMTS Universal Mobile Telecommunications Systems
VHF Very High Frequency
WCDMA Wideband Code Division Multiple Access
WiMAX Worldwide Interoperability for Microwave Access Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. In conventional systems, the device may communicate with the cell site and request or indicate that the device prefers to connect with the cell site on a specific frequency band with a lower latency and a higher speed compared to other available frequency bands. For example, conventional systems automatically connect to 5G when in range of both 5G and 4G. As another example, conventional systems automatically connect to 5G when connected to 4G and come within range of 5G. In such conventional systems, the cell site or network automatically initiates access and communication with the device over the specific frequency band. However, in certain scenarios, it may be desirable to strategically delay access and communication with a device over the specific frequency band for access and/or for communication with the network. For example, UEs connecting to a particular frequency band with a high SPR (e.g., great than 3%, 5%, 10%) and a high loading volume are provided with a lower quality connection experience. Continuing the example, UEs already connected also experience a lower quality connection as more UEs connect to the same frequency band.

The systems and methods provided herein can alleviate one or more of the problems discussed above. As one example, a delayed connection to a frequency band may be desirable when that frequency band has a high SPR or a high loading factor. For instance, in aspects, a system disclosed herein can delay a dynamic change of a user device connection from a second frequency band to a first frequency band. The system may comprise one or more nodes, each of the one or more nodes configured to wirelessly communicate with one or more user devices in a geographic service area. The system may further comprise one or more processors configured to perform operations. The operations may include determining that the first frequency band has a greater SPR than the second frequency band, determining that the first frequency band has a first loading volume above a threshold, and delaying the dynamic change based at least in part on these determinations.

In other aspects, one or more non-transitory computer-readable media disclosed herein can have computer-executable instructions embodied thereon that, when executed, perform a method for delaying a connection of a user device to a first frequency band. The method may comprise determining that the first frequency band has a greater SPR than a second frequency band, determining a threshold for the first frequency band based at least in part on a maximum capacity of user device connections to the first frequency band, determining that the first frequency band has a loading factor above the threshold, and delaying (based at least in part on these determinations) the connection of the user device to the first frequency band for access to a first wireless communication protocol. As such, the method connects the user device to the second frequency band or maintains the connection of the user device with the second frequency band.

Yet another aspect of the present disclosure is directed to a method for delaying a dynamic change of a computer device connection to a first frequency band. The method comprises determining whether the first frequency band has a greater SPR than the second frequency band and determining whether the first frequency band has a loading factor above a threshold. If it is determined that the first frequency band has the greater SPR and that the first frequency band has the loading factor above the threshold, a dynamic change of the computer device connection to the first frequency band is delayed. If it is determined that the first frequency band does not have the greater SPR and that the first frequency band does not have the loading factor above the threshold, the computer device connection is dynamically changed from the second frequency band to the first frequency band.

Being able to delay connections, as recited by the claims, provides a variety of technical benefits, including benefits for users. For example, on the network side, more network efficiencies are realized for both the frequency band in which a connection is delayed and the frequency band in which the device connects to or remains connected to. Users requesting connection to a particular frequency band and users already connected to the particular frequency band are provided with better overall connection experiences.

Figure 1:
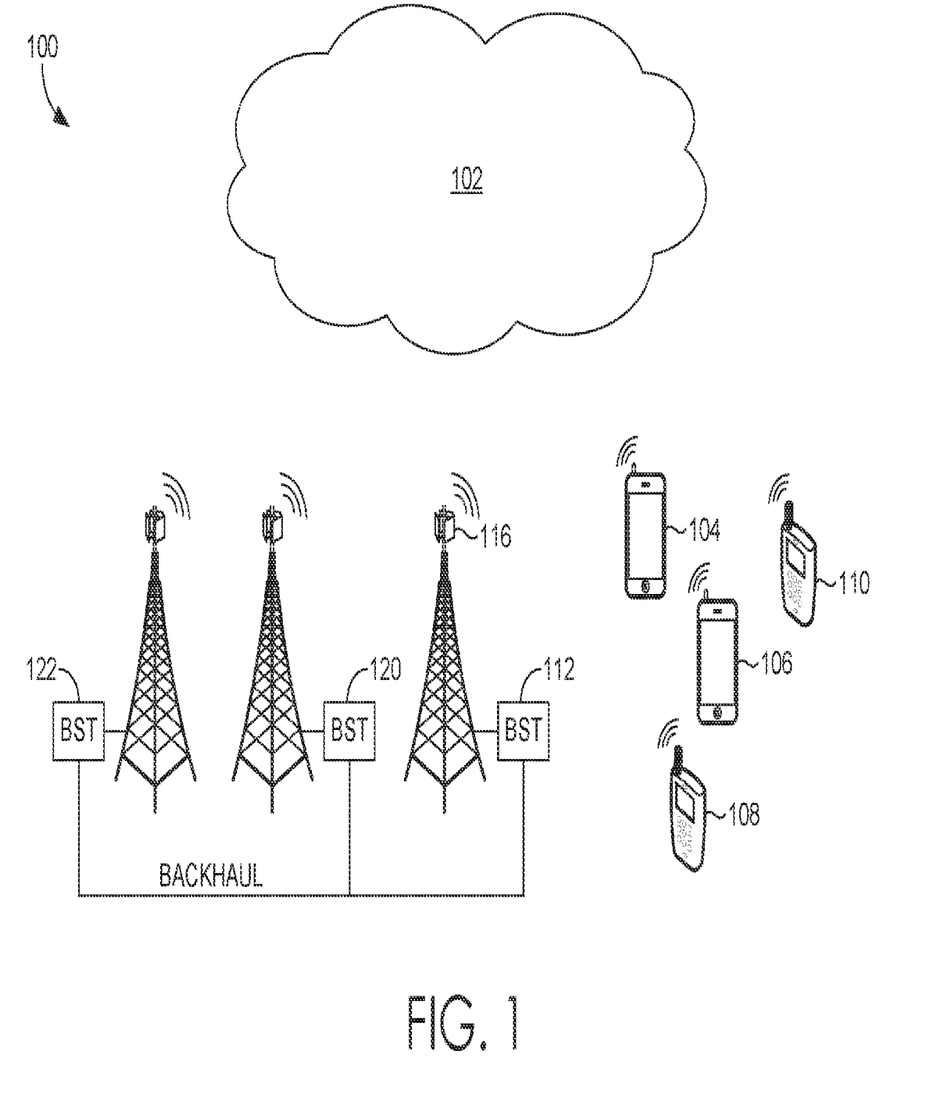
FIG. 1 depicts a diagram of an example computing environment suitable for use in implementations of the present disclosure.

Turning now to FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network 102 that provides service to current UE 104 and 106 and one or more legacy UE 108 and 110. The network 102 may be accessible through a base station 112 that is connected to a backhaul server (not shown). The base station 112 and/or a computing device (e.g., whether local or remote) associated with the base station 112 may manage or otherwise control the operations of components of a cell site, including an antenna array 116. The base station 112 and/or the computing device associated with the base station 112 may include one or more processors and computer-readable storage media having computer-executable instructions or computer instruction modules embodied thereon for execution by one or more processors.

The antenna array 116 may radiate in a particular direction and thus may correspond to a particular sector of a cell site. The antenna array 116 may have a plurality of antenna elements, in embodiments. In one embodiment, the antenna array 116 is configured to have a plurality of elements that in number, arrangement, and/or density, are configured for mMIMO. In one such embodiment, the base station 112 may include a radio and/or a controller, such as a Massive Multiple-Input Multiple-Output Unit for controlling a mMIMO configured antenna array, such as the antenna array 116 having a plurality of antenna elements. The base station 112 may use the controller to monitor one or more of throughput, signal quality metrics (e.g., SINR), a quantity of unique users/subscribers, a quantity of unique UE(s), and/or RLFs that occur at the base station, all of which may be monitored dynamically and/or as stored in a data store.

The base station 112 may use a radio that is connected to the antenna array 116 by a physical RF path, where the radio is used to cause the antenna array 116 to transmit radio-frequency signals using the plurality of antenna elements. The plurality of antenna elements in the antenna array 116 may include portions of antenna elements (not shown). In embodiments, the plurality of antenna elements of the antenna array 116 may be partitioned such that a first portion of antenna elements may be associated with, dedicated to, correspond to, and/or be configured to operate using a first access technology, and a second portion of antenna elements may be associated with, dedicated to, correspond to, and/or be configured to operate using a second access technology. In one embodiment, the plurality of antenna elements may be partitioned into unequal groups or alternatively "split" into equal halves, wherein each group or half operates to provide a coverage area for a distinct access technology when the antenna array 116 operates in a dual technology mode.

In some embodiments, the antenna array 116 is partitioned such that the first portion of antenna elements is associated with the first access technology and the second portion of antenna elements is associated with the second access technology. When the antenna array 116 is operating in a dual technology mode, each portion of the plurality of antenna elements may operate using only one distinct protocol and/or access technology relative to the other portions in the antenna array, in some embodiments. In one example, a first portion of antenna elements may operate using 5G wireless access technology and the second portion of antenna elements may operate using 4G wireless access technology. Additionally, it will be understood that the terms "first" and "second" are used herein for the purposes of clarity in distinguishing portions of antenna elements from one another, but the terms are not used herein to limit the sequence, relevance, number of portions, technological functions, and/or operations of each portion unless specifically and explicitly stated as such.

As such, the base station 112 may provide current UE 104 and 106 and legacy UE 108 and 110 with access to the network 102, in embodiments. In some embodiments, the first portion of antenna elements may communicate with current UE 104 and 106 using 5G technology and the second portion of the antenna elements may communicate with legacy UE 108 and 110 using 4G technology. When operating in the dual technology mode, the antenna array 116 may concurrently connect to and communicate with the current UE 104 and 106 and legacy UE 108 and 110 using, respectively, at least two distinct access technologies.

Accordingly, in one example, when the antenna array 116 is operating in the dual technology mode, the base station 112 concurrently acts an eNodeB (or "eNB") and gNodeB (or "gNB"). As such, the base station 112 may provide service to one or more access technologies to both current and legacy UE. In addition to communicating with the current UE 104 and 106 and the legacy UE 108 and 110, the base station 112 may also communicate with one or more neighboring base stations. In some embodiments, the base station 112 may communicate with neighboring base station 120 using the first access technology and may communicate with another neighboring base station 122 using the second access technology. For example, because the base station 112 may operate concurrently as an eNodeB and a gNodeB using the antenna array 116 that is partitioned and operating in a dual technology mode, the base station 112 may communicate with other base stations, for example, including legacy base stations that cannot use current access technologies (e.g., 5G) or current base stations that lack backward compatibility with prior access technologies (e.g., 4G). In embodiments, the base station 112 may bi-directionally exchange information with neighboring base stations 120 and 122 through an X2 interface or X2 link. Information regarding signal quality, RF conditions, one or more RLFs, and SINR levels at each of the neighboring base stations 120 and 122, and/or as reported from UE to the neighboring base stations 120 and 122 may be communicated to the base station 112 via the X2 link. Additionally or alternatively, information regarding signal quality, RLFs, and SINR levels at each of the neighboring base stations 120 and 122 may be communicated to the base station 112 over the backhaul.

As mentioned, the base station 112 may include a radio and/or a controller, such as an MMU, that enables the base station 112 to adjust or modify the operations and transmissions of the plurality of antenna elements in the antenna array 116. In embodiments, the operations, configurations, and/or settings of each antenna element may be individually controlled and adjusted by the base station 112 using the controller. In some embodiments, the operations, configurations, and/or settings of the first portion of antenna elements may be controlled and adjusted as a group by the base station 112 using a controller, such as an MMU, independent of the second portion of antenna elements. In a similar fashion, the operations, configurations, and/or settings of the second portion of antenna elements may be controlled and adjusted as a group by the base station 112 using the controller, independent of the first portion of antenna elements. Accordingly, the base station 112 may use a controller to independently adjust different groups or portions of antenna elements within one antenna array.

In embodiments, the operations, configurations, and/or settings of each individual antenna element may be adjusted and customized. For example, the base station 112 instructs a portion of antenna elements to transmit one or more synchronization signals using a periodicity. In another example, the portion of antenna elements may transmit a plurality of synchronization signals using the periodicity, as instructed by the base station 112. The synchronization signals may be specific to and/or configured for the first access technology, in embodiments.

Accordingly, the base station 112 may use a controller to independently adjust different individual antenna elements, any number of groupings and/or subset(s) of each portion of antenna elements, and/or portions of antenna elements within one antenna array. In embodiments, the base station 112 may use a controller to measure and monitor one or more of throughput, signal quality metrics (e.g., SINR), a quantity of unique users/subscribers, a quantity of unique UE, and/or RLFs.

Figure 2:
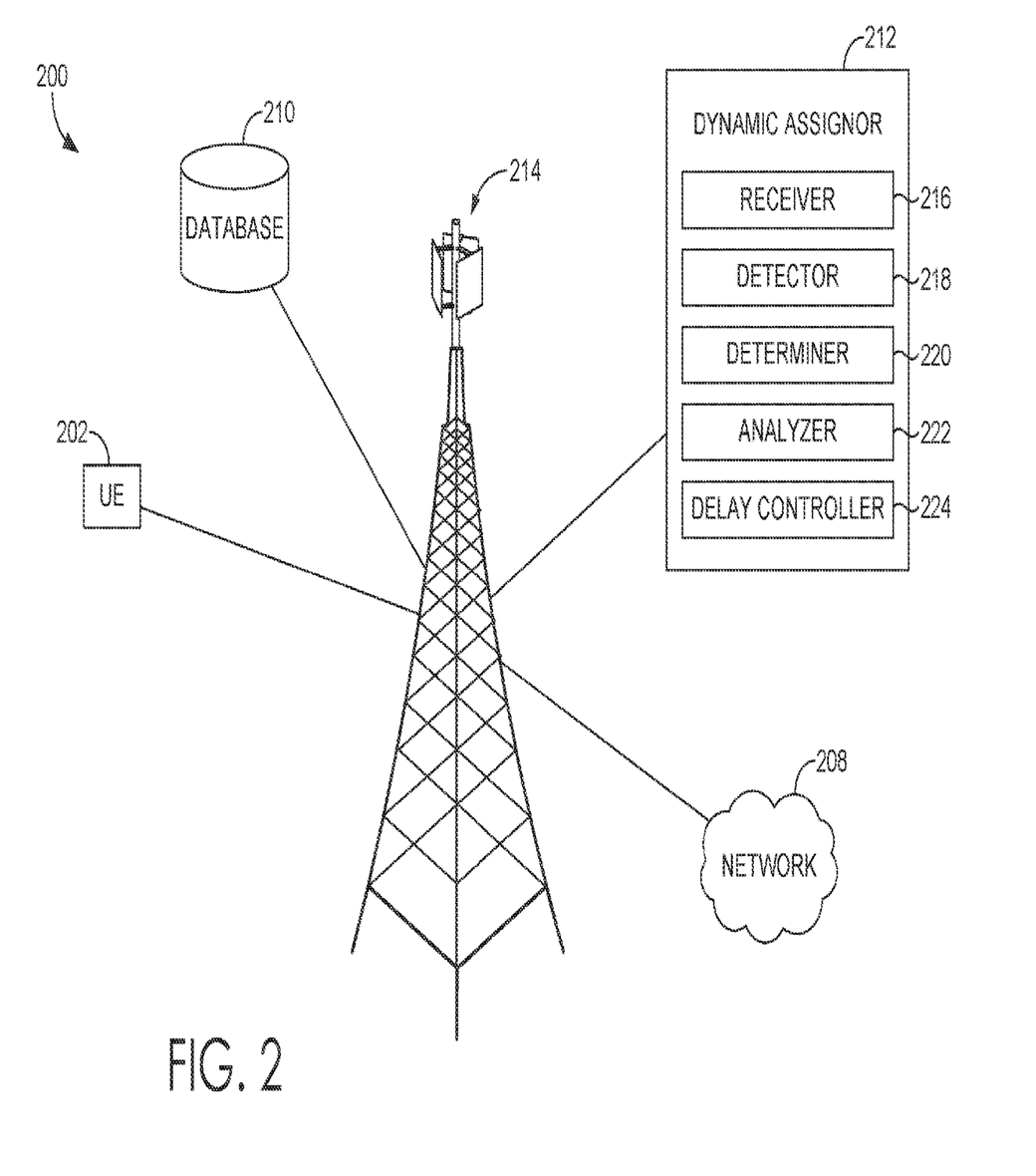
FIG. 2 illustrates a diagram of an example network environment in which implementations of the present disclosure may be employed.

Turning now to FIG. 2, network environment 200 is an exemplary network environment in which implementations of the present disclosure may be employed. Network environment 200 is one example of a suitable network environment and is not intended to suggest any limitation as to the scope of use or functionality of the present disclosure. Neither should the network environment be interpreted as having any dependency or requirement relating to any one or combination of components illustrated.

Network environment 200 includes UE 202 (network environment 200 may contain more UEs), network 208, database 210, dynamic assignor 212, and cell site 214. In the network environment 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a global positioning system (GPS) device, a video player, a handheld communications device, a workstation, a router, an access point, and any combination of these delineated devices, or any other device that communicates via wireless communications with a cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s) and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in network environment 200 may optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the "coverage area" of the cell site or simply the "cell," as used interchangeably hereinafter. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. For the purposes of the present disclosure, it may be assumed that it is undesirable and unintended by the network 208 that the cell site 214 provide wireless connectivity to the UE 202 when the UE 202 is geographically situated outside of the cell associated with cell site 214.

In an exemplary aspect, the cell site 214 comprises a base station that serves at least one sector of the cell associated with the cell site 214, and at least one transmit antenna for propagating a signal from the base station to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As shown, cell site 214 is in communication with the dynamic assignor 212, which comprises a receiver 216, a detector 218, a determiner 220, an analyzer 222, and a delay controller 224. The dynamic assignor 212 may connect UE 202 and other UEs to frequency bands within range of the UE 202 or other UEs for access to network 208. The dynamic assignor 212 may also delay or prevent UE 202 connection to a frequency band for access to network 208. The dynamic assignor 212 may communicate with the database 210 for storing and retrieving data.

For example, the receiver 216 may retrieve data from the UE 202, the network 208, the database 210, and the cell site 214. In some embodiments, the receiver 216 may receive requests from UEs for access to a particular frequency band. Further, data the receiver 216 may access includes, but is not limited to, location information of the UE 202 and channel quality information. Location information may comprise GPS or other satellite location services, terrestrial triangulation, an access point location, or any other means of obtaining coarse or fine location information. The location information may indicate geographic location(s) of one or more of a user device, an antenna, a cell tower, a cell site, and/or a coverage area of a cell site, for example. Channel quality information may indicate the quality of communications between one or more user devices and a particular cell site. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more user devices communicating with the cell site, observed SINR and/or signal strength at the user device(s), or throughput of the connection between the cell site and the user device(s). Location and channel quality information may take into account the UEs' capability, such as the number of antennas of the user device and the type of receiver used by the user device for detection. The receiver 216 may also be configured to receive information from cell sites other than cell site 214 or other processors and/or servers.

The receiver 216 may also access SPR. An SPR is a measure of an antenna's ability to minimize interference. SPR describes a RF power that is radiated outside of an antenna array's sector relative to a RF power that is radiated and retained within the antenna array's sector. Because SPR is a ratio, SPR may be represented using a percentage value or numerical value. An example of a low SPR value is 3-4% and an example of a high SPR value is 8-10%. Antennas with greater spillover areas have greater SPR values. SPR information may be used for dynamically combatting interference and noise at cell site 214. Additionally, the SPR values of cell site antennas may be used for selection and assignment of specific frequency bands to component carriers of UEs in a telecommunications environment.

Increased or high SPR values have negative impacts, which are exacerbated in LTE environments that allow and facilitate multiple frequency bands and carrier aggregation for combining multiple frequency bands for uplink and/or downlink communications. Negative impacts that high-powered, undesired RF radiation at a cell site causes may be reduced or mitigated by assigning a frequency band of low-SPR antennas to a primary component carrier of a UE. For example, a frequency band that corresponds to a low-SPR antenna may be assigned to the primary component carrier of an inter-carrier aggregation capable device that is geographically located at or near radio frequency "spillover" areas (i.e., radiation outside of an antenna's desired sector at a cell site) and which is experiencing lower throughput.

Additionally, SPR quantifies the power of RF radiation that is outside of the sector of an antenna relative to the power of the RF radiation radiated within the same sector of the same antenna. As such, the SPR represents the power of the undesired RF signal relative to the power of the desired RF signal, for a particular antenna. Accordingly, SPR is a measure of power and undesired RF radiation refers to an amount of power of the undesired RF radiation. Thus, as undesired RF spillover of an antenna increases, the SPR of the same antenna increases and vice versa, when all other factors are controlled. As undesired RF spillover and SPR increase, interference and noise increase at the cell site 214. Due to these measures, SPR may be used as a predictor, indictor, and/or measure of an antenna's likelihood of causing interference and noise, or actual causation of interference and noise. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example.

Further, SPR for an antenna may be calculated using RF radiation patterns. For example, the SPR of the antenna accounts for the power of its undesired RF signal relative to the power of the desired RF signal. The SPR of the antenna quantifies the amount of power of the undesired RF radiation contributed by the antenna to areas relative to the amount of power of the desired RF radiation in a sector of the antenna. Due to spillover among various antennas, certain areas experience the presence of interference and noise.

Turning to detector 218, the detector 218 may detect UEs within a range, frequency bands, SPRs of frequency bands, and loading factors (e.g. loading volume) corresponding to frequency bands, etc. Loading factors may change depending upon the day and time of day (e.g. world events such as natural disasters, terror attacks, pandemics, or religious holiday may prompt surges of UE traffic to or from specific locations), and may be stored in the database 210. Loading factors may include cell site 214 heat signature information, cell site 214 component performance information, channel quality information, or processor load measurements. Factors affecting the heat signature information of the cell site 214 include component model, component type, manufacturer, age of a component, wear and tear due to environmental factors, etc. Further, loading factors may also include an amount of current, backhaul traffic, or an anticipated current or backhaul traffic. Additionally, factors affecting loading volume may include a quantity of users connected to a frequency band or antenna properties at a time of receiving communication parameters from UEs connected to the frequency band. Other factors affecting loading volume may also include a capacity of the frequency band and data received from the quantity of users connected to the frequency band. The data received from the quantity of users may comprise a rate at which UEs are connected to and disconnected from the frequency band.

Detector 218 may also detect wireless communication protocols and wireless telecommunications networks associated with particular frequency bands. For example, the detector 218 may detect a first wireless communication protocol of a first frequency band is a 5G wireless communication protocol and a second wireless communication protocol of a second frequency band is a 4G wireless communication protocol. Additionally, the detector 218 may detect a third wireless communication protocol of a third frequency band comprises both a 5G and a 4G wireless communication protocol.

Turning to determiner 220, the determiner 220 may determine a frequency band corresponding to the antenna has the lowest SPR at the cell site relative to all other frequency bands at the cell site. In some embodiments, a frequency band corresponding to one antenna may have an SPR value that is less than an SPR value of another adjacent antenna at the cell site. Determiner 220 determines the SPR of a first frequency band is higher than at least one other frequency band at the cell site 214. The determiner 220 may also compare the SPR of a first frequency band to other frequency bands at other cell sites.

Determiner 220 may also determine whether the frequency bands have a loading factor or a loading volume above a threshold. This determination may be based on a network-loading evaluation at a particular time or a combination of network-loading evaluations. As one example, the determiner 220 may determine an amount of data queued for transmission by a frequency band on a backhaul is above the threshold. Further, this determination may be based on a quantity of UEs communicating with an access node representative of an eNodeB or availability of uplink resources corresponding to the frequency band. Furthermore, this determination may be made at least in part on communication signals for a UE requesting access for communication with the frequency band and historical loading data of UEs for the frequency band or a combination of frequency bands.

Determiner 220 may also determine the threshold. For example, the threshold may be based at least in part on a maximum capacity of UE connections to a particular frequency band. The threshold may also be determined based on a comparison of a first loading volume for a first frequency band with a first maximum capacity and a comparison of a second loading volume for a second frequency band with a second maximum capacity, the second frequency band being the frequency band the UE is connected to, and wherein the UE is requesting access to the first frequency band. The threshold of a particular frequency band may be a maximum quantity of UEs connected to the particular frequency band. The threshold may change based on antenna elements of the corresponding antenna array and frequency band. The threshold may also change based on the historical data of access resources on particular days and times of the days.

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the determiner 220 may dynamically determine SPR values of antennas at the cell site 214 when a UE enters the service coverage area of the cell site. Alternatively, determiner 220 may determine SPR values of the antennas at the cell site 214 periodically, the dynamic as signor 212 storing the SPR values in the database 210 at the base station controlling the cell site 214. Stored SPR values may be referenced when a UE enters a service coverage area of the cell site 214. Additionally or alternatively, SPR values of the antennas at the cell site 214 may be determined for individual antennas when each antenna is installed at the cell site and stored in database 210 at the base station controlling the cell site 214. In this way, dynamically determined or periodically updated SPR values may be compared, for example, by the base station to an initial or installation SPR value so that the performance of each antenna can be monitored, for example.

Analyzer 222 may compare a loading volume for a frequency band with a maximum capacity of the frequency band. The analyzer 222 may compare, graph, assess, and generate tables using the historical information of SPR values and loading factors corresponding to frequency bands over time. Accordingly, the analyzer 222 may use this information for predicting whether a delay of a dynamic change of UE connection to a frequency band or a delay of a connection of a UE to the frequency band will occur at a certain time on a certain day. Further, the analyzer 222 may use this information for predicting a range of a loading factor at a certain time on a certain day. Furthermore, the analyzer 222 may use this information for predicting an SPR value or range for a particular frequency band at a particular day or time of the day. Additionally, the analyzer 222 may analyze the historical information for improving threshold values at various times.

Lastly, delay controller 224 may delay a dynamic change of a computer device connection to a first frequency band for communication with a first wireless communication protocol. Continuing the example, the delay may be based at least in part on the first frequency band having a greater SPR than another frequency band and the first frequency band having a loading factor above a threshold. Further, the delay controller 224 may delay a connection of a UE to the first frequency band for access to the first wireless communication protocol and connect the UE to a second frequency band having a lower SPR than the first frequency band. Furthermore, the delay controller 224 may delay a dynamic change of a user device connection to the first frequency band for access to the first wireless communication protocol. Continuing the example, the delay may be based at least in part on the first frequency band having a high SPR and the first frequency band having a loading volume above a threshold.

Figure 3:
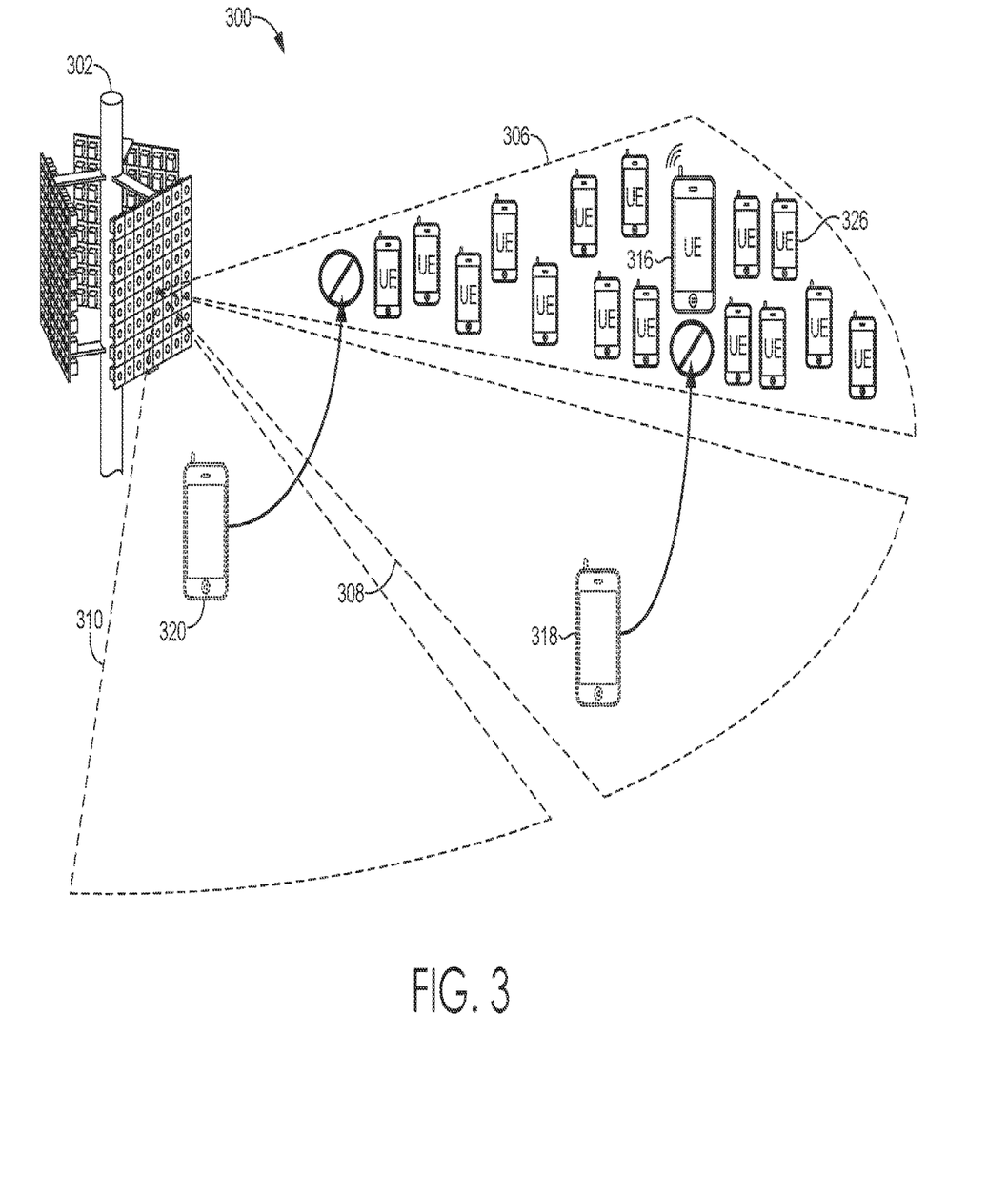
FIG. 3 illustrates an example multiple frequency band environment in which implementations of the present disclosure may be employed.

Turning now to FIG. 3, exemplary multiple frequency band environment 300 comprises cell site 302, a first antenna array 303, one or more antennas 304, a first frequency band 306, a second frequency band 308, and a third frequency band 310. As can be seen in the aspect depicted in FIG. 3, the first antenna array 303 includes the one or more antennas 304. In aspects, the one or more antennas 304 may be dipole antennas, having a length, for example, of ¼, ½, 1, or 1½ wavelength. In aspects, the first antenna array 303 may be an active antenna array, FD-MIMO, massive MIMO, 3G, 4G, 5G, and/or 802.11. While we refer to dipole antennas herein, in other aspects, the one or more antennas 304 may be monopole, loop, parabolic, traveling-wave, aperture, yagi-uda, conical spiral, helical, conical, radomes, horn, and/or apertures, or any combination thereof. It is noted that adjusting one or more individual power supplies to the one or more antennas 304 of the first antenna array 303 may be applicable to an antenna array comprising any type of antenna targeting any portion of the RF spectrum (though any lower than VHF may be size prohibitive). In one aspect, the one or more antennas 304 may be configured to communicate in the UHF and/or SHF spectrum, for example, in the range of 1.3 GHz 30 GHz.

By way of a non-limiting example, the first antenna array 303 may comprise 64 antenna elements 304 arranged in an 8×8 structure. In other aspects, the first antenna array 303 may comprise antenna elements arranged in an 8×4, 4×8, or 4×4 configuration. Each antenna element 304 of the first antenna array 303 comprises a dedicated power supply having a certain phase and amplitude to a respective antenna element 304. In an aspect, the power supply comprises a power amplifier. In an aspect not depicted in the figures, the base station may further comprise a processor. The processor may be any one or more processors, servers, computer processing components, or the like. In some aspects, the processor may be communicatively coupled to each node and/or to each antenna of each node.

In certain aspects, the first antenna array 303 may communicate or is capable of communicating with devices, using a 5G wireless communication protocol. While in this example, 5G is mentioned as a wireless communication protocol, it should be understood that any wireless communication protocol standard may be utilized for example, 3G, 4G, LTE, 5G, 802.11, or any other operator-elected wireless communication protocol standard. In the aspect depicted in FIG. 3, the first antenna array 303 can include 64 antenna elements each with a distinct direction which may be known, and where each antenna element is capable of communicating with one or more devices, e.g., using one or more specific beams, each identifiable as a beam index, as referred to herein, in aspects. In the same or alternative aspects, a device may communicate with more than one antenna element of the first antenna array 303. In aspects, using the methods and systems disclosed herein with a high-density antenna array, such as the first antenna array 303, and using a 5G wireless communication protocol as an example, can facilitate the strategic assignment of beam indices and/or allotment of beam indices tailored for a specific purpose or environment.

In some embodiments, the receiver 216, in communication with the cell site 302, may detect when a UE enters an area covered by one or more antenna elements of an antenna array, e.g., the first antenna array 303 of the cell site 302 of FIG. 3. In some embodiments, UEs may detect and/or measure one or more signals, e.g., synchronizations signals, from the antenna array when entering an area covered by the one or more antenna elements of the antenna array. As one example, UE 318 may have connection with the second frequency band 308 and UE 320 may have connection with the third frequency band 310. Continuing the example, receiver 216 may receive, from UE 318 and UE 320, an inquiry for connecting to the first frequency band 306. In some aspects, the inquiry may include an identification of one or more preferred beam indices identified by the UE 318 or UE 320 for connection to the first frequency band 306. In various aspects, the inquiry may optionally also include signal strength values for each of the one or more identified beam indices. Further, as discussed above, the inquiry can include additional information associated with the UE 318 or UE 320, such as one or more identifiers associated with the UE 318 or UE 320.

By way of example, as depicted by FIG. 3, detector 218 may detect that the first frequency band 306 has a high loading volume due to a high number of UEs 326 connected to the first frequency band 306. Further, determiner 220 may determine that both the second frequency band 308 and the third frequency band 310 have lower SPRs than the first frequency band 306. Furthermore, determiner 220 may determine that the loading volume of the first frequency band 306 is above a threshold. Accordingly, the UE 318 and UE 320 connection to the first frequency band 306 would be delayed. A dynamic change of the UE 318 connection from the second frequency band 308 to the first frequency band 306 and the UE 320 connection from the third frequency band 310 to the first frequency band 306 for access to a first wireless communication protocol would occur, for example, when the loading volume of the first frequency band 306 is at or below the threshold.

The order in which UE 318 or UE 320 connects to the first frequency band 306, when the loading volume of the first frequency band 306 is at or below the threshold, may depend upon the earliest time in which the inquiry for connecting to the first frequency band 306 was received. For example, if UE 318 inquired for connection to the first frequency band 306 before UE 320 inquired, UE 318 may connect to the first frequency band 306 before UE 320. In other embodiments, the UE 320 may connect to the first frequency band 306 before UE 318 because UE 320 is receiving a stronger signal from the first frequency band 306 than UE 318. In other embodiments, UE 318 may connect to the first frequency band 306 before UE 320 because the UE 318 inquiry comprised a request for less data usage than the inquiry from UE 320. In other embodiments, UE 318 may connect to the first frequency band 306 before UE 320 because UE 318 has a higher capability than UE 320 (e.g. UE 318 has a greater number of antennas and a better quality receiver). In other embodiments, UE 318 may connect to the first frequency band 306 before UE 320 because the UE 318 has a stronger SINR and/or signal strength at the UE 318, or a stronger throughput of the connection with the cell site 214. In other embodiments, UE 318 and UE 320 may connect to the first frequency band 306 at the same time.

Figure 4:
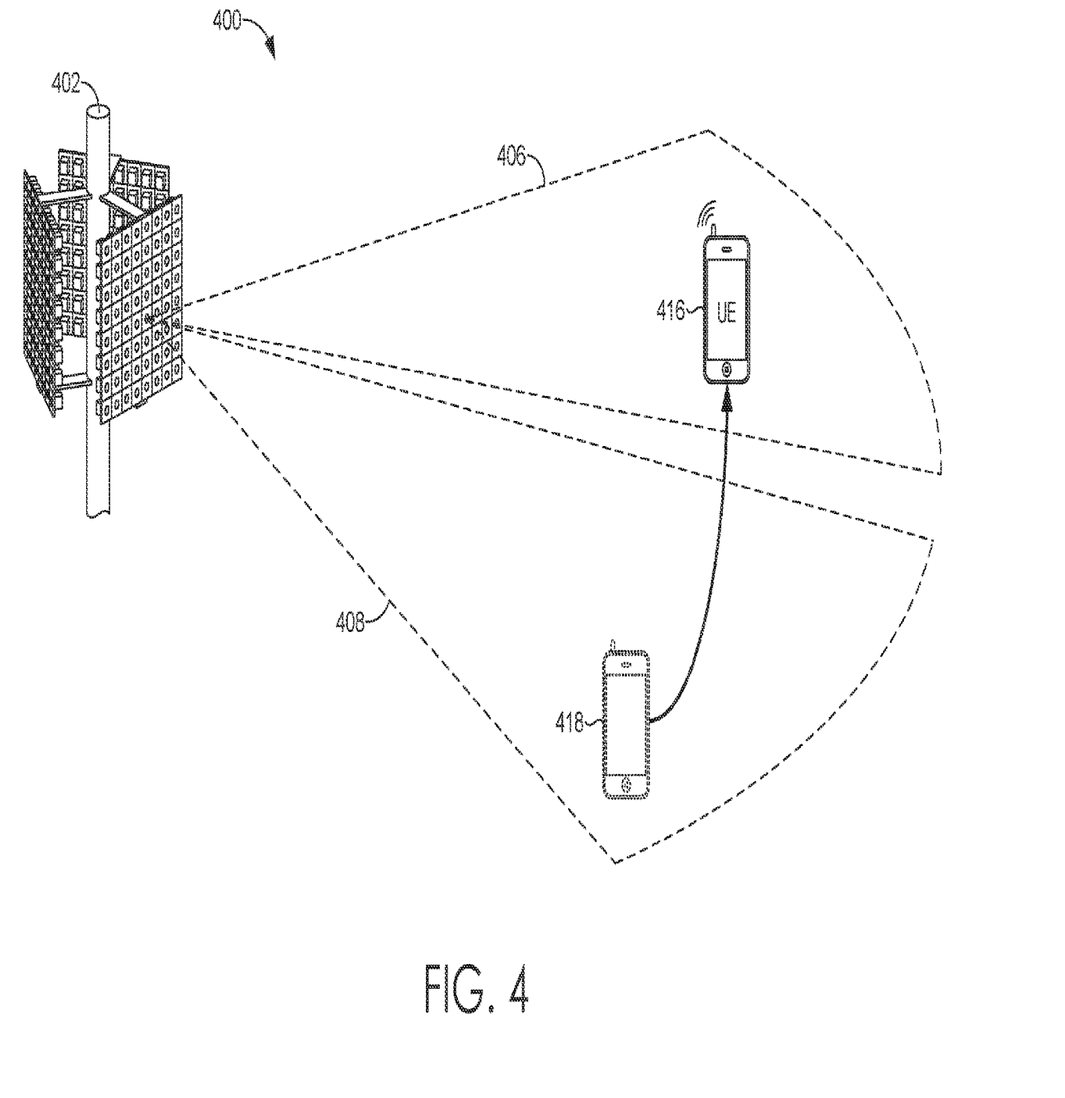
FIG. 4 illustrates an example multiple frequency band environment in which implementations of the present disclosure may be employed.

Turning now to FIG. 4, exemplary multiple frequency band environment 400 comprises cell site 402, a first frequency band 406 and a second frequency band 408. First, it is determined that the first frequency band 406 has a greater SPR than the second frequency band 408 and that the first frequency band has a loading factor at or below a threshold. The threshold relating to the loading factor, in some embodiments, is based on a number of UEs connected with the first frequency band 406, a number of UEs connected with the first frequency band 406 compared with a maximum capacity of the first frequency band 406, a power level corresponding to the first frequency band 406, a comparison of the power level of the first frequency band 406 to a total power level of the first frequency band 406 and the second frequency band 408, a number of UEs communicating with a wireless access node corresponding to the first frequency band 406 during a time range, a signaling load quantification (including an instantaneous signaling load level, an average signaling load level, or other type of signaling load representation), an interference quantification, a noise quantification, or combinations thereof.

Based at least in part on the determination that the first frequency band 406 does not have the loading factor above the threshold, UE 418 connection to the second frequency band 408 is dynamically changed to the first frequency band 406. Accordingly, UE 416 (previously UE 418 during its connection to the second frequency band 408) is now connected to the first frequency band 406 for access to a first wireless communication protocol. In some embodiments, the first frequency band 406 supports at least two radio-accessible technologies and the second frequency band 408 supports one radio-accessible technology. In some embodiments, the first wireless communication protocol of the first frequency band 406 is a 5G wireless communication protocol and a second wireless communication protocol of the second frequency band 408 is a 4G wireless communication protocol.

Figure 5:
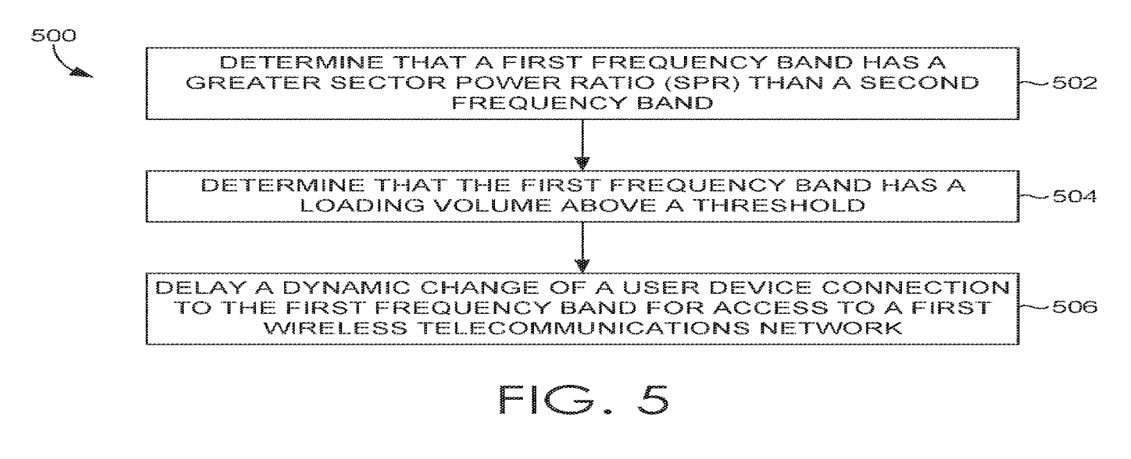
FIG. 5 depicts a flow diagram of an example method for delaying a dynamic change of a user device connection to the first frequency band for access to a first wireless communication protocol, in accordance with implementations of the present disclosure.

Turning now to FIG. 5, flow diagram 500 comprises an exemplary method for delaying a dynamic change of a user device connection from a second frequency band to a first frequency band. Initially at block 502, a first frequency band is determined to have a greater SPR than a second frequency band. The determination may occur in response to an inquiry from a UE for connecting to the first frequency band 306. At block 504, a first frequency band is determined to have a loading volume above a threshold. The determination may occur in response to an inquiry from a UE for connecting to the first frequency band 306. The loading volume may be determined based on a quantity of users connected to the first frequency band, based on antenna properties at a time of receiving communication parameters from user devices connected to the first frequency band, based on a capacity of the first frequency band and data received from the quantity of users connected to the first frequency band, or based on a comparison with a maximum capacity. For example, a first loading volume for the first frequency band may be compared to a first maximum and a second loading volume for a second frequency band may be compared to a second maximum capacity. Additionally, a first loading volume for the first frequency band at a first time of a first day may be compared to a second loading volume for the first frequency band at a second time of the first day and at a third time of a second day. At block 506, a dynamic change of a user device connection to the first frequency band for access to a first wireless communication protocol is delayed.

Figure 6:
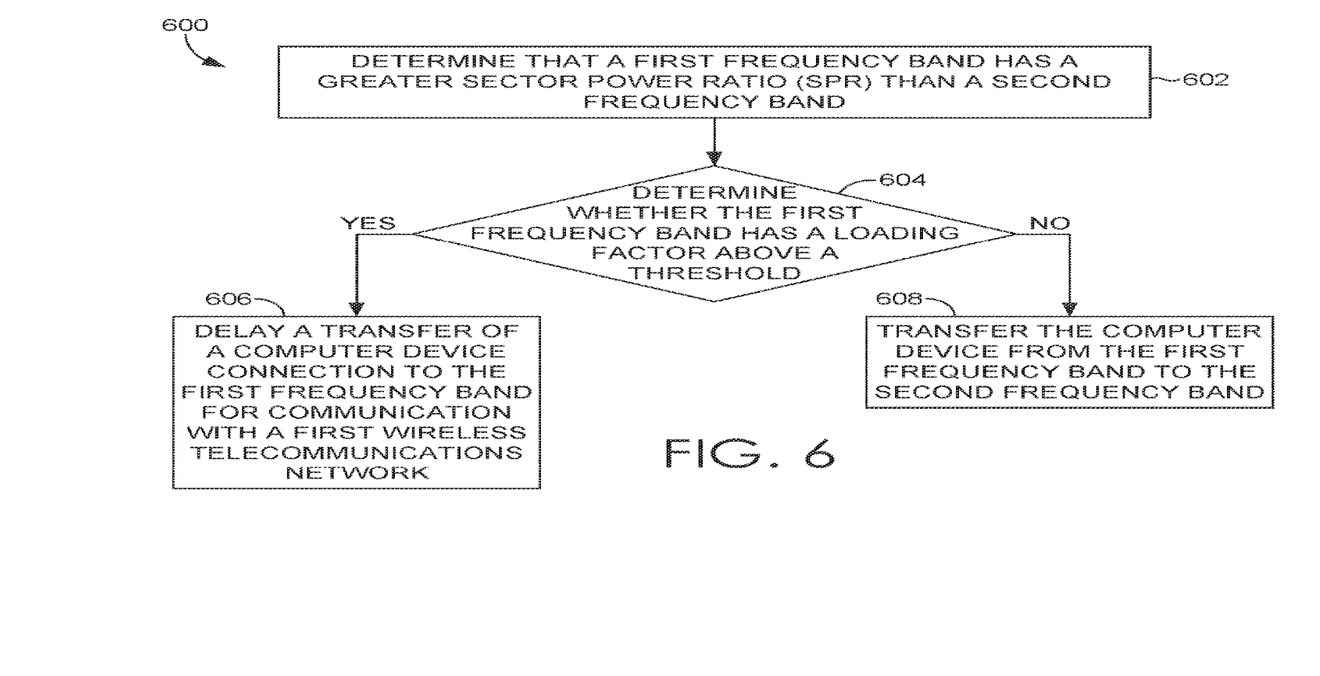
FIG. 6 depicts a flow diagram of an example method for determining whether to delay the dynamic change, in accordance with implementations of the present disclosure.

Turning now to FIG. 6, flow diagram 600 comprises an exemplary method for determining whether to delay the dynamic change. Initially at block 602, a first frequency band is determined to have a greater SPR than a second frequency band. At block 604, a determination is made as to whether the first frequency band has a loading factor above a threshold. At block 606, if the loading factor is above the threshold, a computer device connection is delayed from changing to the first frequency band for communication with a first wireless communication protocol. At block 608, if the loading factor is not above the threshold, the computer device connection is dynamically changed from the second frequency band to the first frequency band. The loading factor corresponding to access resources comprising data sessions, voice calls, data quantities, and text message traffic. Additionally, the threshold changes based on antenna elements of an antenna array corresponding to the first frequency band. Further, a change to the threshold based on historical data of access resources on particular days and times of the days may be predicted.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A base station configured to wirelessly communicate with one or more user devices in a coverage area via at least one antenna array the base station associated with one or more processors configured to perform operations comprising:
    determine a loading factor for a first frequency band, the loading factor related to the at least one antenna array;
    determine a loading factor threshold for the first frequency band within the coverage area based on historical loading factors;
    determine a sector power ratio (SPR) for the first frequency band;
    determine that the first frequency band has a greater SPR than a second frequency band;
    determine that the first frequency band has a loading factor above the loading factor threshold;
    predict a delay of a dynamic connection modification of a user device to the first frequency band, the prediction based on the first frequency band having the greater SPR than the second frequency band at the time of the predicted delay and based on the loading factor being above the loading factor threshold;
    receive a request from the user device for connection to the first frequency band; and
    delay the dynamic connection of the user device to the first frequency band during the time for the predicted delay.

2. The system of claim 1, wherein the loading factor threshold is determined based on historical loading access resources associated with the at least one antenna array on a particular day and a particular time range during the particular day.

3. The system of claim 1, wherein the request from the user device includes location information of the user device and a capability of the user device including a number of antennas of the user device and a receiver type of the user device, and wherein the delay of the dynamic connection modification of the user device to the first frequency band is predicted based on the location information and the capability of the user device.

4. The system of claim 1, wherein the greater SPR of the first frequency band is determined based on an electric tilt and a mechanical tilt associated with the at least one antenna array.

5. The system of claim 1, wherein the greater SPR of the first frequency band is determined based on technical operating specifications of the at least one antenna array and materials of the at least one antenna array.

6. The system of claim 1, wherein the loading factor is determined based on heat signature information corresponding to the at least one antenna array, antenna performance information of the at least one antenna array, channel quality information corresponding to the first frequency band, an processor load measurement corresponding to the one or more processors of the base station.

7. The system of claim 1, wherein the loading factor is determined based on an amount of current and backhaul traffic corresponding to the at least one antenna array and the first frequency band.

8. The system of claim 1, wherein the second frequency band, having the lower SPR than the first frequency band, corresponds to an antenna array that is different from the at least one antenna array of the base station.

9. The system of claim 1, wherein the greater SPR of the first frequency band is determined based on radio frequency radiation patterns corresponding to the at least one antenna array.

10. One or more non-transitory computer-readable media having computer-executable instructions embodied thereon that, when executed, perform a method for delaying a dynamic connection modification of a user device to a first frequency band, the method comprising:
    determining a loading factor threshold for frequency bands corresponding to a base station that provides a coverage area, wherein the loading factor threshold is determined based on an availability of resources for user devices within at least a portion of the coverage area;

determining a first loading factor associated with the first frequency band;

determining a sector power ratio (SPR) for a first frequency band of the frequency bands;

determining the first loading factor is above the loading factor threshold;

determining that the SPR for the first frequency band is greater than an SPR of a second frequency band;

predict a delay of the dynamic connection modification of the user device to the first frequency band, the prediction based on determining that the first frequency band has the greater SPR at the time of the predicted delay, and wherein the prediction is also based on the first loading factor being above the loading factor threshold;

receive a request from the user device for connection to the first frequency band; and delay the dynamic connection of the user device to the first frequency band during the time for the predicted delay.

11. The one or more non-transitory computer-readable media of claim 10, wherein the first loading factor is determined based on an amount of data queued for transmission by the first frequency band on a backhaul.

12. The one or more non-transitory computer-readable media of claim 10, wherein the SPR for the first frequency band is determined based on at least one environmental condition and a power supplied to at least one antenna element, of the base station, corresponding to the first frequency band.

13. The one or more non-transitory computer-readable media of claim 10, wherein the loading factor threshold is determined based on historical loading factors for the frequency bands.

14. The one or more non-transitory computer-readable media of claim 10, wherein the delay is predicted based on an amount of current and backhaul traffic corresponding to at least one antenna element and the first frequency band, and an amount of current and backhaul traffic corresponding to at least one antenna element and the second frequency band.

15. The one or more non-transitory computer-readable media of claim 11, further comprising delaying the dynamic connection modification of the user device to the first frequency band until the first loading factor is below the loading factor threshold.

16. A method for delaying a dynamic connection modification of a computer device to a first frequency band of a base station, the method comprising:

receiving channel quality information for a first frequency band corresponding to a first set of antenna elements of the base station, the first set of antenna elements within a coverage area of the base station;

determining a first loading factor associated with the first set of antenna elements and user devices within the coverage area for the first frequency band based on the channel quality information;

determining the first loading factor is above a loading factor threshold;

determining a sector power ratio (SPR) for the first frequency band;

determining that the SPR for the first frequency band is greater than a second SPR of a second frequency band;

predict a delay of the dynamic connection modification of a user device to the first frequency band, the prediction based on the SPR for the first frequency band being greater than the second SPR of a second frequency band at the time of the predicted delay, and wherein the prediction is also based on the first loading factor being above the loading factor threshold;

receive a request from the user device for connection to the first frequency band; and delay the dynamic connection of the user device to the first frequency band during the time for the predicted delay.

17. The method of claim 16, wherein the channel quality information is received from the user device and other user devices within the coverage area of the base station.

18. The method of claim 16, wherein the first loading factor corresponds to access resources comprising voice calls and text message traffic.

19. The method of claim 16, wherein the loading factor threshold is determined based on a maximum quantity of the user devices for communications with the first frequency band.

20. The method of claim 16, wherein the delay of the dynamic connection modification is predicted based on historical SPRs for the first frequency band and the second frequency band.

* * * * *